United States Patent [19]

Legille

[11] 4,074,816

[45] Feb. 21, 1978

[54] CHARGE METERING APPARATUS FOR SHAFT FURNACES

[75] Inventor: Edouard Legille, Luxembourg, Luxembourg

[73] Assignee: S.A. des Anciens Etablissements Paul Wurth, Luxembourg, Luxembourg

[21] Appl. No.: 339,118

[22] Filed: Mar. 6, 1973

[30] Foreign Application Priority Data

Mar. 6, 1972 Luxembourg .......................... 64910

[51] Int. Cl.$^2$ .............................................. B65G 69/00

[52] U.S. Cl. .................................. 214/2; 214/18 PH; 214/18 V; 214/18.38; 214/37; 222/77; 177/145; 214/152

[58] Field of Search ................. 214/2, 17 CB, 18 PH, 214/18 V, 18.38, 152, 37, 35, 35 A; 222/58, 59, 77; 177/145

[56] References Cited

U.S. PATENT DOCUMENTS

| | | | |
|---|---|---|---|
| 1,140,340 | 5/1915 | Taussig | 214/2 |
| 3,220,567 | 11/1965 | Bothmer et al. | 214/2 |
| 3,429,463 | 2/1969 | Blau et al. | 214/17 CB X |
| 3,533,523 | 10/1970 | Schneider | 214/37 |
| 3,559,820 | 2/1971 | Munson | 214/2 |
| 3,693,812 | 9/1972 | Mahr et al. | 214/17 CB X |
| 3,782,528 | 1/1974 | Burger et al. | 214/2 X |

*Primary Examiner*—Frank E. Werner

[57] ABSTRACT

A charge metering system for a shaft furnace is disclosed. The furnace charging apparatus includes means for continuously measuring the charge material in a supply hopper and a metering valve for controlling the material flow rate from the supply hopper. In order to permit accurate charge weight measurement the supply hopper is isolated from dimensional displacements which may be induced in the furnace and associated equipment during operation by means of an articulated suspension system comprising a three hinged arch construction.

12 Claims, 1 Drawing Figure

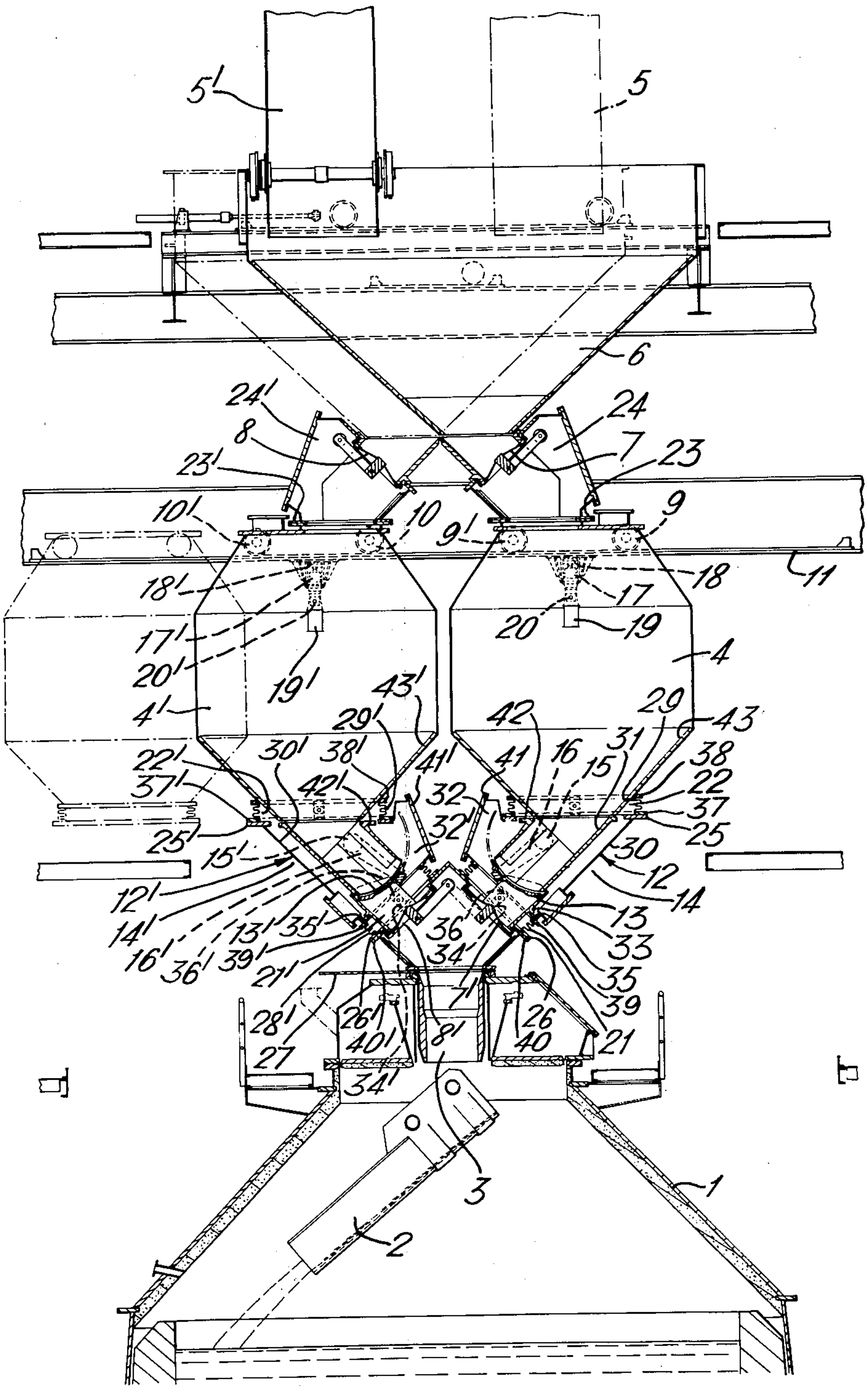
5'
5
6
24'
24
8
7
23'
23
10'
10
9'
9
11
18'
18
17'
17
20'
20
19'
19
4'
4
43'
43
29'
29
42
30'
38'
41'
41
16
15
31
38
22'
22
37'
42'
32
32'
37
25
25'
15'
30
12
12'
14
14'
13
33
13'
35'
36
34'
16'
36'
39'
21'
35
39
7'
26
26'
21
28'
27
40'
40
8'
34'
3
1
2

CHARGE METERING APPARATUS FOR SHAFT FURNACES

BACKGROUND OF THE INVENTION

1. Field of the Invention

This invention relates to the charging of furnaces and particularly shaft furnaces. More specifically, the present invention is directed to a metering device which, in addition to enabling control of the flow of charge material being directed onto the hearth of a blast furnace, also permits the weight or volume of the charge to be accurately measured whereby the measured quantity may thereafter be employed to position the material flow control device. Accordingly, the general objects of the present invention are to provide novel and improved methods and apparatus of such character.

2. Description of the Prior Art

While not limited thereto in its utility, the present invention is particularly well suited for use with a blast furnace. The construction of modern high production blast furnaces has imposed new and more stringent demands on the charging apparatus due in part to the increased internal pressures employed within the furnace and the increased dimensions of the hearth within the furnace over which the charge must be uniformly distributed. In order to optimize furnace operation; i.e., to obtain the greatest possible pig iron production in a large high pressure furnace; it is necessary to be able to measure and exercise control over all of the operating processes both in and on the furnace. Control of the of the charge of ore on the furnace hearth is a matter of primary importance because the profile of the charge provides the basis for the control of further operating processes within the furnace.

Among the problems which must be overcome in order to obtain the desired uniform operation of a blast furnace are those associated with the gassing of the charge material and the control of the distribution of the charge. A degree of success in avoiding disturbances to furnace operation by non-uniform gassing has been achieved through the expedient of pretreatment of all of the charge materials by grinding and screening to obtain a narrow grain size range and by sintering or pelletizing the material to achieve a charge which is as granular as possible. However, even with the uniform grain size the requisite high pressure at the furnace throat can not be maintained without also taking into consideration the profile of the charge. In fact, it has been found that the importance of charge distribution control is directly related to the degree of classification of the charge material. Restated, experience has shown that efforts to perform the charging process in such a way that the desired furnace operating parameters are not jeopardized must increase as the uniformity of the charge material increases.

The conventional furnace charging units of the prior art included a lower bell-type distributor. Furnace charging was accomplished by first loading the bell-type distributor and thereafter lowering the distributor into the furnace. These bell-type distributor charging devices inherently could not achieve a uniform distribution of the charge over the complete charging plane. That is, efforts previously made to supply bell-type distributors with charge material in a uniform manner over their periphery have not prevented the formation of a hollow cone below the distributors. In other words, the well known characteristic M-curve of the charge surface can not be avoided by the uniform distribution of the charge on the periphery of a lower bell-type distributor. The use of adjustable throat armors can only partially alleviate the considerable disadvantage of non-uniform charge distribution in the case of blast furnaces with large hearth diameters.

U.S. Pat. No. 3,693,812 issued Sept. 26, 1972 to R. Mahr et al discloses apparatus which permits the optimal uniform distribution of a furnace charge over the entire charging area. The novel charging apparatus of U.S. Pat. No. 3,693,812 comprises a distributing member rotatably arranged in the throat of a shaft furnace and angularly adjustable relative to the longitudinal axis of the furnace. The adjustable distributing member or chute is supplied from a centrally arranged spout; the spout providing communication between the distributing member and one or more storage hoppers in which charges of the furnace raw materials are temporarily stored. In the prior art such storage hoppers have conventionally been in the form of sluice bins which deliver materials to the centrally arranged spout via metering devices such as discharge channels, throttle members, vibration zones, etc.

The metering devices of the prior art have only served to prevent the direct unimpeded out-flow of the charge material to the distributing member. Thus, the main characteristic of previously known metering devices, in addition to exercising a degree of metering action by influencing the material flow rate, is a braking action which insures that too rapid a feed rate is avoided while simultaneously insuring that there will be an adequate feed rate to provide sufficiently large forces to prevent a blockage of the charge in the region of the supply hopper outlet port. The prior art metering devices have not been capable of accurately measuring the charge in the interest of facilitating control of the charging operation.

SUMMARY OF THE INVENTION

The present invention overcomes the above briefly discussed and other deficiencies and disadvantages of the prior art by providing a metering system adapted to the demands of modern high output blast furnace operation. The metering system of the present invention permits the accurate control and, if desired, automation of the introduction of high-grade charge material of varying compositions into a furnace. Thus, the present invention enables monitoring of the complete charging operation of a high pressure furnace and thereby permits satisfactory and random control of the charging process.

The above and other objects of the present invention are achieved by continuously measuring the charge in the storage hoppers from which a shaft furnace is supplied during the charging process. Also in accordance with the invention, the result of the measurement performed on the charge in a storage hopper may be employed to control a metering device positioned intermediate the outlet port of the hopper and a rotatable and angularly adjustable distributing member positioned in the furnace throat. In accordance with a further aspect of the invention, the distributing member may itself be controlled by a signal commensurate with the instantaneous charge weight or volume as provided as a result of the measurement of the charge in the storage hopper. Accordingly, a furnace charging process can be continuously controlled with the present invention and such control can be achieved in accordance with a predetermined program.

Pursuant to the present invention, each of the charge storage bins of a shaft furnace is in the form of a weighing hopper equipped with a measuring unit which operates independently of the furnace pressure or other disturbing parameters. Accordingly, the measuring unit always provides an accurate indication of the weight of the material in the hopper. The out-flow channel of each weighing hopper is closed by a throttle or flow control valve and the position of this valve may be controlled by a signal commensurate with instantaneous weight of the burden in the hopper. Accordingly, the charge or burden out-flow can be controlled in such a manner that a particular quantity of charge material is supplied to the distributing member in the furnace throat over a predetermined time. The distributing member is therefore, in accordance with the invention, advantageously in the form of an angularly adjustable revolving chute of the type disclosed in U.S. Pat. No. 3,693,812.

Further in accordance with the disclosed embodiment of the invention, each storing and weighing hopper includes pressure compensating means whereby the forces resulting from pressures transmitted to the hopper from the furnace throat during the charging process are absorbed in such a manner that these forces will not influence the weight measurement. Thus, when the storage hopper is employed to measure weight, as opposed to volume, the hopper will not be rigidly connected to the furnace throat. Rather, in the interest of providing a fixed reference point for the measuring device, a trackless load cell which pivotally supports its respective storage hopper will be employed to sense the weight of the charge. The connection between the storage hopper and the furnace inlet is comprised of a pair of hinged compensators arranged to cooperate with the pivotal connection between the load cell and hopper to define a three point hinged suspension; the suspension connection of the storage hopper to the load measuring cell being considered as a fixed point. Any differential longitudinal displacements of the blast furnace head or throat and the furnace superstructure below the storage hoppers, such displacements being caused by pressure and/or temperature influences encountered during operation, are converted by this novel three point hinged suspension into angular displacements and thus do not impair the weight measurement. As an added benefit of this three point hinged suspension, compensation for unavoidable dimensional divergences encountered when assembling the various parts of the charging apparatus will be provided in such a way that such dimensional divergences will exert no influence on the measuring unit and the weight measurements to be performed thereby.

BRIEF DESCRIPTION OF THE DRAWING

The present invention may be better understood and its numerous objects and advantages will become apparent to those skilled in the art by reference to the accompanying drawing which is a longitudinal section taken through a schematic representation of a first embodiment of a charging installation in accordance with the invention.

DESCRIPTION OF THE PREFERRED EMBODIMENT

As previously noted, the present invention contemplates a bell-less distributor for use in the charging of a shaft furnace. Thus, in accordance with the invention, an angularly adjustable rotary distribution chute 2 is mounted within a throat or head 1 of a blast furnace. Chute 2, which is angularly adjustable relative to the vertical axis of the furnace, is supplied with raw material from a centrally arranged feed spout 3 during the charging process. The feed spout 3 in part provides, in the manner to be described below, communication between chute 2 and one or more storage hoppers. The charge material or furnace burden is fed to the storage hoppers 4, 4′ via a movable filling hopper 6 which is in turn supplied by means of skips 5, 5′. Other ways of loading the storage hoppers 4 and 4′, such as means employing a belt and a reversible fill charging device, may obviously be employed.

The storage hoppers 4, 4′ are constructed as pressure hoppers in order to insure that the furnace throat 1 is sealed to the atmosphere during the charging process. Thus, the charging hoppers 4, 4′ are provided respectively with upper sealing valves 7 and 8 and lower sealing valves 7′ and 8′. The valves 7 and 8 are, in the manner well known in the art, opened singly to permit the sequence of loading the hoppers and the subsequent charging of the furnace; the valves being opened or closed at the charging rate whereby pressure compensation within the hoppers is performed in the well known manner. The hoppers 4, 4′ are provided at their upper ends with respective feed connections or assemblies 24, 24′; the feed connections being attached to the hoppers via respective flange connections 23, 23′. Hoppers 4 and 4′ are provided at their discharge or lower ends with respective discharge channel assemblies, indicated generally at 12 and 12′, which are connected to the hoppers by means of respective detachable flange connections 37 and 37′. The flange connections 23, 23′ and 37, 37′ permit the rapid replacement of hoppers 4, 4′. In order to permit movement thereof should it become necessary to replace the storage hoppers, hoppers 4 and 4′ are respectively provided with rollers 9, 9′ and 10, 10′ which cooperate with support rails 11. It is to be noted that, in the manner to be described below, during normal operation the rollers 9 and 10 are out of contact with the support rails 11.

Means within the discharge channel assemblies 12, 12′ direct the charge material from hoppers 4, 4′ into the central feed spout 3 at an angle of 45° relative to the vertical. The discharge channel assemblies 12, 12′ are fixed to the central feed spout 3 by means of screw flange connections. A horizontally displaceable closure member 27 is provided at the upper end of feed spout 3. The member 27 can be inserted in the feed channel so as to seal the furnace charging port or throat 1 in a gas tight manner. The closure member 27 is employed when the pressure in the blast furnace must be isolated from the outer atmosphere as, for example, upon the dismantling of one of the lower sealing valves 7′, 8′. When one of storage hoppers 4, 4′ or discharge channel assemblies 12, 12′ is dismantled, the lower sealing valves 7′, 8′ may alone be employed for sealing purposes.

The discharge channel assemblies 12 and 12′ include respective throttle valves 13 and 13′ for controlling the flow of charge material to the distribution chute 2. The throttle valves 13 and 13′ are rotatable about respective axes and may be inserted in or removed from the material flow path by means of respective externally located drives 14, 14'; operation of the valves being accomplished via respective pivot shafts 15, 15' and associated lever arm 16, 16'. The throttle valves 13, 13' control the flow of charge material but do not perform a sealing function with respect to the furnace throat pressure. As shown, throttle valves 13, 13' are of arcuate shape. The construction and operation of valves 13, 13' is described in more detail in corresponding application Ser. No. 339,296, filed contemporaneously herewith and incorporated herein by reference; copending application Ser. No. 339,296 being assigned to the assignee of the present invention. The flow rate of charge material, as explained in the referenced copending application, will be dependent upon the material type and grain size and during charging will vary about a predetermined intermediate position of the throttle valves. The adjustment of the position of the throttle valves about this intermediate position may be controlled either automatically or manually as a result of monitoring the weight or quantity of the charge in hoppers 4, 4' in the manner to be described below. Alternatively, between two charging processes a new intermediate throttle valve position is calculated as a function of the results of the previous charging process.

The weight measurement of the charge in the hoppers 4 and 4' is performed by respective trackless load measuring cells 17 and 17'. The load measuring cells 17, 17' are rigidly connected to the underside of bearing rail 11 respectively at points 18 and 18'. For weight measurement, as opposed to volume measurement, a fixed or reference point is necessary for the load cells 17, 17'. As will become apparent from the description below, this reference point is provided by the attachment points 18, 18' on the underside of bearing rail 11. Suspension bracket means 19 and 19' are respectively provided on the exterior of hoppers 4 and 4'. The hoppers 4, 4' are pivotally suspended from respective load cells 17, 17' by suspension means 19, 19' via respective swivels 20, 20'.

As will be obvious to those skilled in the art, in view of the thermal expansions encountered during operation and high pressure which will be established in the storage hoppers during the charging operation, the hoppers 4, 4' must not be rigidly connected to the blast furnace supply port. Such a rigid connection would, of course, prevent accurate charge weight measurement.

As previously noted, the central feed spout 3 is rigidly connected to the head or throat 1 of the blast furnace. The connection between the discharge outlets of storage hoppers 4, 4' and feed spout 3 is achieved by means of the discharge channel assemblies 12, 12'. The discharge channel assemblies comprise fixed pressure tight protective outer sleeves or shells 30 and 30', inner tubular material discharge troughs 31 and 31', and the metering valves 13 and 13'. The outer sleeves 30 and 30' are, at their upper ends, provided with respective flanges 25 and 25'. The sleeves 30 and 30' are provided at their lower ends with respective further flanges 35 and 35'. The control devices for the metering valves 13 and 13' are attached to sleeves 30 and 30'. The outer sleeves 30 and 30' are designed in such a way that in their fully opened state the valves 13 and 13' will be guided into respective recesses 32 and 32' defined by the outer sleeves. The sleeves 30 and 30' are provided with respective hatches, normally sealed by blind flanges 41 and 41', which permit inspection and servicing of metering valves 13 and 13'.

The inner tubular material discharge troughs 31 are provided, on their charge material contacting surfaces, with a coating of a suitable low friction material in order to reduce wear of these members. Since metering valves 13 and 13' are connected, by respective lever arms 16 and 16', to respective shafts 15 and 15'; the shafts passing through the outer sleeves 30 and 30'; no relative movements will occur between the discharge troughs and the metering valves. To insure maintenance of the spacing between the lower ends of the troughs 31 and 31' and respective metering valves 13 and 13', the troughs 31 and 31' are respectively provided with flanges 42 and 42'. The flanges 42, 42' are preferably attached, at three points, to aforementioned upper flanges 25, 25' of respective outer sleeves 30, 30'. The attachment, by means of three screw connections, is designed to permit an adjustment of the lower end of the troughs 31, 31' with respect to the metering valves 13, 13' without displacement of the troughs 31, 31' relative to outer sleeves 30, 30'. Additionally, as will be explained below, clearance must be provided between the upper end of troughs 31 and 31' and the discharge ports of respective bins 4 and 4'; this clearance permitting a limited angular adjustment of troughs 31 and 31' relative to hoppers 4 and 4'.

First or upper externally supported corrugated compensators 22, 22' are welded, via their respective upper flanges 38, 38', to the outer casing of respective storage hoppers 4, 4'. The compensators 22, 22' are connected, via their respective lower flanges 37, 37', to upper flanges 25, 25' of respective outer sleeves 30, 30' of the discharge channel assemblies 12, 12'. Second or lower externally supported corrugated compensators 21, 21' are attached, via their respective upper flanges 39, 39', respectively to the lower flanges 35, 35' of sleeves 30, 30' of discharge channels 12, 12'. The second or lower external compensators 21, 21' are also connected, via their respective lower flanges 26, 26', to respective flanges 40, 40' provided on the upper end of the central spout 3. The compensators 21, 21' and 22, 22' respectively comprise corrugated pressure-resistant flexible outer sleeves 28, 28', 29 and 29'.

During the charging process one of the lower sealing valves 7', 8' will be open and the interior of the discharge channel assemblies 12, 12' will thus be under furnace throat pressure. This pressure, which may be very high, will produce both radially outwardly and axial forces which are applied to the compensators. The axial forces will attempt to force the individual corrugation of the compensators apart and thus will attempt to axially enlarge compensators 21 and 22. Since the supply hoppers 4 and 4' function simultaneously as storage means and weight measurement devices, if the axial enlargement were permitted, the axial forces on the compensators would create inaccuracies in the measured value of charge weight. Accordingly, the compensators 21, 21', 22 and 22' are provided with means which prevent their axial enlargement. Thus, the corrugated compensators 21, 21' are respectively provided with a pair of diametrically opposed arms 34, 36 and 34', 36' which overlap one another in the axial direction. The arms 34, 34' are fixed to respective compensator lower flanges 26, 26' while arms 36, 36' are connected to respective compensator upper flanges 39, 39'. The arms 34, 36 and 34', 36' are connected to one another in such a manner that movement in the axial direction is not possible but relative rotational movement is permitted. In the interest of increased stability, the arms 34, 34′ can be U-shaped and cooperating arms 36, 36′ can be introduced into the slot defined by arms 34, 34′ and the arms subsequently pinned together. The compensators 22 and 22′ are provided with identical means to that described immediately above in the interest of preventing axial extension thereof.

The swivel connections 20, 20′, the upper externally supported corrugated compensators 22, 22′ and the lower externally supported corrugated compensators 21, 21′ cooperate to define a three point hinged connection between fixed points 18 and 18′ of load cells 17 and 17′ and the central feed spout 3 which is rigidly attached to the blast furnace supply port or throat 1. During operation any forces or displacement components which occur in the vertical direction are received by this three point hinged connection and converted into angular displacements. The supply hoppers 4 and 4′ can therefore be considered as suspended virtually freely on respective load cells 17 and 17′.

Not only does the manner of mounting supply hoppers 4 and 4′ provide compensation for pressure and thermally induced displacements of all components positioned below the supply hoppers 4 and 4′, but additionally the three point hinged construction compensates for any unavoidable variations in the size of the various components which may be encountered upon installation of the various components of the charging apparatus. Thus, the three point hinged construction of the present invention isolates the load cells 17 and 17′ from all parasitic forces; all forces and displacements being received by the compensators and converted into an angular displacement of the discharge channel assemblies 12 and 12′ between compensators 21 and 22 or 21′ and 22′. It is to be particularly noted that a positional change of the discharge channel assemblies 12 and 12′ can produce rotation only of storage hoppers 4 and 4′ about suspension points 20 and 20′; no other positional change of the supply hoppers being permitted.

Any contact between the flowing charge material and the compensators 21 and 22 must be avoided in the interest of preventing damage to the compensators. The upper compensators 22 and 22′ will therefore be isolated from the flowing charge material by means of slide sheets 43 and 43′ positioned within the supply hoppers. The slide sheets extend over the complete height of the compensators 22 and 22′ as shown.

Material guiding and protecting channels 33 and 33′ are fitted on respective lower flanges 35 and 35′ of the outer sleeves 30 and 30′ in the interest of protecting the lower compensators 21 and 21′ from being contacted by the flowing charge material. The guiding channels 33 and 33′ are arranged such that their upper ends project partially into the space between outer sleeves 30 and 30′ and their respective discharge troughs 31 and 31′. The lower ends of channels 33 and 33′ are supported against respective flanges 40 and 40′ of the central feed spout 3. The lower ends of the protective channels 33 and 33′ extend over the seat portion of the sealing surface of the lower sealing valves 7′ and 8′ so as to protect the valve seats as well as the compensators from damage by the flowing charge material. Unlike the material flow troughs 31 and 31′, the protective channels 33 and 33′ are not tubular but rather form pipe segments whose size is selected, taking the particular operating conditions into account, to protect the compensators and sealing valve seats.

In the course of mounting the storage hoppers on their respective load cells and assembling the overlapping arms which prevent the axial expansion of the compensators 21 and 22, care must be taken to insure that these devices are arranged in such a manner that they do not have a disturbing influence on one another during an angular variation of the discharge channel assemblies 12 and 12° relative to their original position. As briefly noted above, the rollers 9, 9′ and 10, 10′ are adjusted in the vertical direction so that during normal operation they do not contact the bearing rail 11; the rollers being lowered only for moving the storage hoppers during disassembly. The measured values provided by the load cells are transmitted to respective indicators or recorders so that a continuous monitoring of charge weight in each hopper is performed. If deemed desirable, suitable data processing equipment may be provided to evaluate the weight measurements and to thereafter employ such measurements, in the manner to be briefly discussed below, in the generation of control signals for the charge flow control throttle valves 13 and 13′ or the movements of chute 2.

In accordance with a preferable mode of operation of the disclosed embodiment of the invention, it is desired to achieve an approximately constant material feed flow rate during the charging process. Such a constant feed rate coupled with proper control of the distribution chute 2 will result in a uniform charge height across the entire furnace hearth. The material supply per time unit is determined as a function of the initial weight of the charge in the supply hoppers and the time necessary for the distribution chute 2 to describe a complete charging configuration. The medium initial position of each throttle valve 13 is adjusted on the basis of experimental values and is primarily dependent on the grain size of the charge material. During discharge of the material from the supply hopper the throttle valve position is corrected relative to the medium initial value. Another possibility for exercising control over the material discharge rate from the storage hoppers 4 and 4′ contemplates supplying data commensurate with the predetermined desired material flow rate to a computer and to compare the same with the values which actually occur during a charging process, as provided by monitoring the rate of change of the supply hopper weight, and to then perform the correction determined by the computer during subsequent charging operations.

As an alternative to the above described charging procedures, control based upon the weight measurement may be exercised over the distributing chute 2. Thus, by way of example, the material feed to chute 2 can be effected either discontinuously or continuously with different feed quantities per time unit in accordance with a predetermined curve. Under such circumstances the signals provided by the weight measurement can be employed, after suitable processing, to control the movements of chute 2 to vary both the rotational speed and the angular position of the chute.

In the interest of substantially continuous charging it is possible to add a third storage hopper to the charging apparatus. This permits the storage volume of the individual hoppers to be reduced and offers the advantage that if one of the three hoppers fails further operation can continue substantially undisturbed without any essential reduction of blast furnace production.

The weight determination of the charge in the storage hoppers provides the additional benefit of redundancy with respect to the conventional weighing devices which are customarily employed at the main ore storage pit. Thus, if the conventional weighing devices fail, the trackless load cell on the intermediate hoppers 4 and 4' are nevertheless available so that an accurate weight measurement is still possible.

As a further benefit, maximum time utilization is obtained by monitoring the output of the load cells 17 and 17' for an "empty" indication. This makes waiting after the emptying of a hopper unnecessary and refilling of the storage hopper can thus take place immediately after receipt of the "empty" indication and the closing of both the lower sealing valve 8 and the regulating and metering valve 13. With particular respect to the charge flow metering valve 13, the simplicity of its construction and its sturdiness are to be noted; these characteristics being particularly well adapted to the severe working conditions of blast furnace operation whereby the frequency of replacement of the parts of the metering valve which are subject to wear is substantially reduced when compared to the prior art.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for use in the delivery of materials to the interior of a shaft furnace, said furnace having a vertical axis and operating with a high counter-pressure, said apparatus comprising:

at least one storage hopper for providing intermediate storage for a charge of material to be delivered to the furnace, said storage hopper having a supply port and a discharge port;

weighing means associated with said storage hopper;

means pivotally supporting said storage hopper on said weighing means;

means defining a discharge channel for said storage hopper;

first flexible coupling means connecting the first end of said discharge channel defining means to said storage hopper;

means for delivering material discharged from said storage hopper through said discharge channel defining means to the furnace, said delivering means including material flow control valve means, said delivering means being mounted on the furnace; and second flexible coupling means for connecting the second end of said channel defining means to said delivering means, said first and second flexible coupling means and said supporting means cooperating to define a suspension for said hopper which converts differential displacements between said hopper and the furnace to angular displacements which do not significantly degrade the accuracy of measurements provided by said weighing means.

2. The apparatus of claim 1 further comprising:

adjustable charge distributing means positioned within the furnace, said distributing means receiving material passed by said delivering means flow control valve means.

3. The apparatus of claim 1 wherein said weighing means comprises:

at least a first load cell.

4. The apparatus of claim 1 wherein said discharge channel defining means comprises:

a discharge trough, said trough communicating at a first end with said storage hopper discharge port, the second end of said trough being positioned to direct material exiting said storage hopper through said delivering means flow control valve means;

a discharge channel housing enveloping said discharge trough, said first flexible coupling means connecting said housing to said storage hopper.

5. The apparatus of claim 4 wherein said weighing means comprises:

at least a first load cell.

6. The apparatus of claim 5 further comprising:

adjustable charge distributing means positioned within the furnace, said distributing means receiving material passed by said delivering means flow control valve means.

7. The apparatus of claim 1 wherein said delivering means comprises:

a feed spout having a discharge end centrally located with respect to the furnace axis; and a metering valve for controlling the rate of flow of material to the inlet end of said feed spout from said discharge channel defining means.

8. The apparatus of claim 7 wherein said channel defining means comprises:

a discharge trough having a first end positioned to communicate with said storage hopper discharge port, the second end of said discharge trough being positioned to direct material exiting from said storage hopper to said feed spout through said metering valve; and housing means enveloping said discharge trough, said housing means being hermetically attached along opposed peripheral portions thereof to said first and second flexible coupling means.

9. The apparatus of claim 8 further comprising:

adjustable charge distributing means positioned within the furnace, said charge distributing means being located so as to receive material exiting from the discharge end of said feed spout.

10. The apparatus of claim 9 wherein said weighing means comprises:

at least a first load cell.

11. A method for controlling the charging process of a shaft furnace, the furnace having a vertical axis and operating with a high counter-pressure, comprising the steps of:

loading an intermediate storage hopper with material to be delivered to the interior of the furnace, the loading being performed while the interior of the hopper is at atmospheric pressure;

isolating the interior of the hopper from the ambient atmosphere;

equalizing the pressure interior of the hopper to the pressure existing within the furnace;

controllably delivering the charge material from the pressurized hopper to the interior of the furnace to achieve a desired flow of material onto the furnace hearth;

continuously measuring the quantity of material in the hopper during the delivery of such material into the furnace whereby the distribution thereof may be adjusted as a function of the quantity measurement; and converting linear differential displacements between the hopper and the furnace to angular displacements of the hopper which will not have a deleterious effect on the quantity measurement.

12. The method of claim 11 wherein the step of controllably delivering charge material to the furnace includes:

positioning a metering valve to adjust the cross-sectional area of the flow path for the charge materials to achieve a desired rate of flow of charge material.

* * * * *